UNITED STATES PATENT OFFICE.

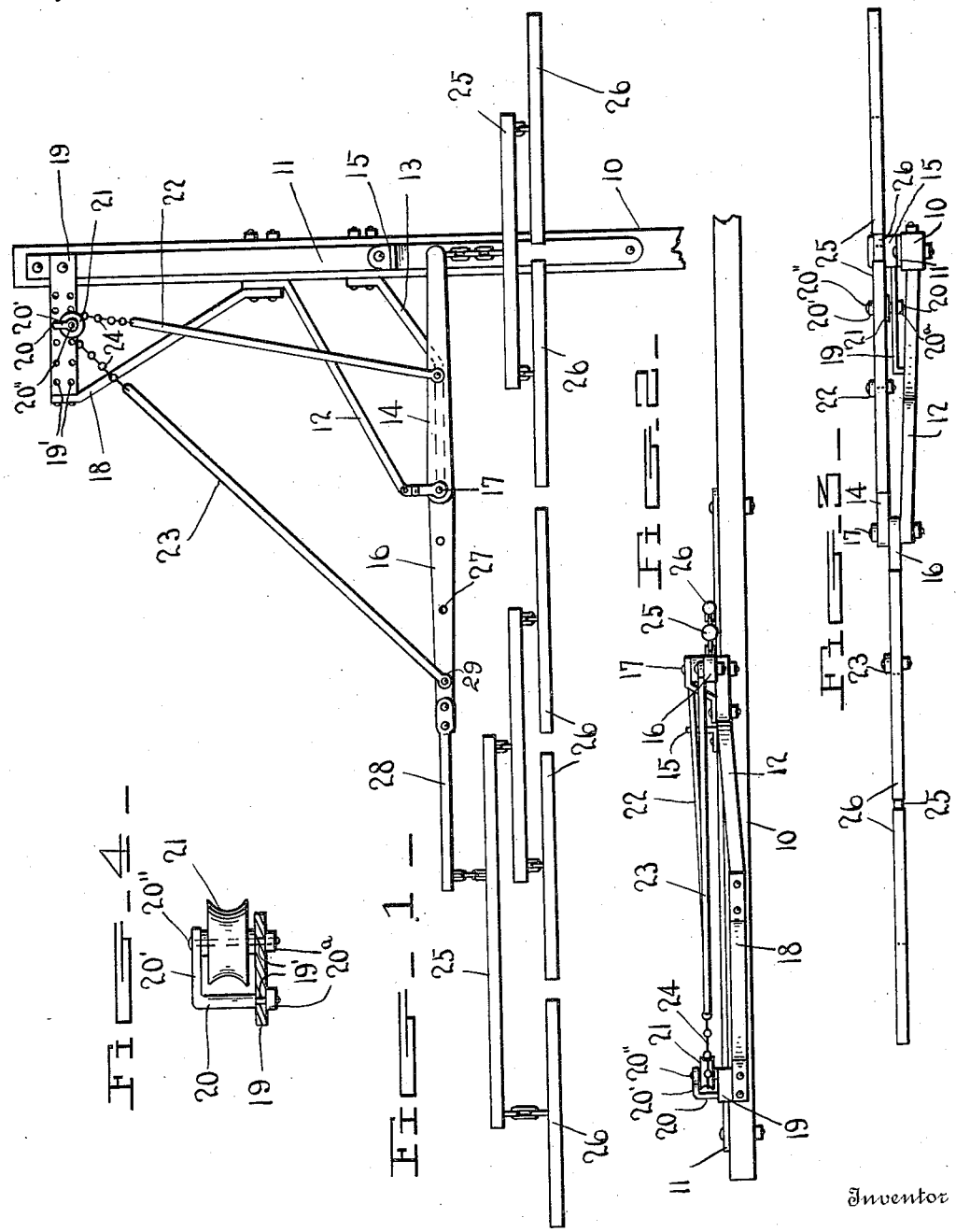

HERBERT B. WHITE, OF CEDAR FALLS, IOWA.

SIDE-DRAFT EVENER.

1,031,760. Specification of Letters Patent. Patented July 9, 1912.

Application filed July 13, 1910. Serial No. 571,796.

*To all whom it may concern:*

Be it known that I, HERBERT B. WHITE, a citizen of the United States, residing at Cedar Falls, in the county of Blackhawk, State of Iowa, have invented certain new and useful Improvements in Side - Draft Eveners; and I do hereby declare the following to be a full, clear, and exact description of the invention, such as will enable others skilled in the art to which it appertains to make and use the same.

This invention relates to draft eveners and is especially designed for agricultural machinery, wherein a sufficient number of draft animals may be conveniently attached by the proper adjustment of the parts comprising the invention.

One object of the invention is to provide an improved general construction of eveners of this character.

With the above and other objects in view, the invention consists in general of certain novel details of construction and combinations of parts hereinafter fully described, illustrated in the accompanying drawings and specifically set forth in the claim.

In the accompanying drawings, like characters of reference indicate like parts in the several views, and Figure 1 is a top plan view of a draft pole equipped with this evener, only that portion of the pole being shown to which the evener is attached, the evener being arranged for five horses. Fig. 2 is a side elevation of such a pole. Fig. 3 is a front elevation of the device applied to a pole. Fig. 4 is a detail view of a certain roller or sheave used in connection with this invention.

The numeral 10 indicates a draft pole and on the upper side of this draft pole is secured a plate 11, the plate serving as a wear plate and also for the purpose of strengthening the pole at the point where the evener mechanism is applied.

At 12 is a rear brace which is secured to that side of the pole on which it is desired that the greater number of draft animals shall be located and this rear brace projects outwardly and forwardly and its outer end is bolted to a similar front brace 13 arranged on the same side of the pole and extending outwardly to meet the brace 12.

At 14 is a lever which is pivoted at one end to the outer ends of the members 12 and 13 and the other end of this lever extends inward over the pole 10, being received in a stop 15 bolted to the plate 11. This stop 15 serves to limit the movement of the lever 14 about its pivot point. At 16 is a similar lever which extends outward from the members 12 and 13 and is pivoted at its inner end to these members. The connecting bolt for the members 12 and 13 is indicated at 17 and this connecting bolt serves as a pivot common to both the levers 14 and 16.

Secured to the pole 10 behind the rear brace 12 is a bracket 18 which extends outwardly and inwardly and has its outer end secured to a plate 19 provided with pairs of openings 19′ adapted to receive the shank 20 of a brace member 20′ and the pivot bolt 20″ which passes through a suitable opening formed in the forward end of the arm 20‴. These members are secured in the plate 19 by suitable nuts 20ª. On the bolt 20″ rotates a sheave 21.

Attached to the lever 14, preferably midway of its ends, is a rod 22 and attached in a similar position to the lever 16 is a rod 23. The ends of these rods are connected by a chain 24 which passes around the sheave 21.

On the inner end of the lever 14 and the outer end of the lever 16 are doubletrees 25 carrying the usual swingletrees 26. The lever 16 is also provided with a bolt receiving opening 27 through which the bolt 17 is adapted to pass when it is desired to use the device as a three horse evener, this opening 27 being so located that the lever arms will be in proper proportion when more horses are attached.

In the form of the invention shown there is provided an extension arm 28 which is adapted to be secured to the lever 16 and is of such length that the proper proportion will be given the levers 16 and 14 for use with three horses at the extension and two attached to the lever 14. It will be obvious that if the rod 23 was attached to the lever 16 at either the opening for four horses or that for three this lever with its extension would be entirely too long. In order to overcome this defect the end of the rod 23 which is attached to said lever is moved to register with a bolt receiving opening 29 so positioned that the stresses on the rods 23 and 22 will be equal when three horses are attached to the end of the extension 28 and two horses to the end of the lever 14.

In using this invention, the sheave 21 is so located on the bracket 18 that the required amount of side draft is obtained to overcome the draft due to the action of the agricultural machine to which the pole is attached. The horses are then attached to the swingletrees in the ordinary manner. Now, if the horses next to the pole pull harder than the horses away from the pole the lever 14 will be drawn forward and this movement of this lever will draw the lever 16 backward, the movement being permitted through the rod 22, chain 24 and rod 23 from the lever 14 to said lever 16. On the contrary, if the lever 16 is moved forward by the draft animals the lever 14 will be drawn backward through the medium of said rods and chain. If it be desired to turn to the left and the pole horses drawn in for this purpose the lever 14 will be drawn back until the end of the lever over the pole engages the rear end of the stop member 15 when the movement of the two levers 14 and 16 will be arrested and the device act as though rigid. The same effect will be obtained by backing the pole horses. If it is desired to use the device as a four horse evener the bolt 17 is positioned through the opening 27 and the doubletree 25 on the lever 14 replaced by a swingletree. The action in this case will be the same as that previously described.

There has thus been provided a simple and efficient device of the kind described and for the purpose specified.

It will be obvious that minor changes may be made in the invention without departing from its principles. For instance the rear bracket can be used on the opposite side of the tongue from the front bracket, the evener can be used on either side of the tongue and suitable ferrules may be used on the pivot bolts.

Having thus described the invention, what is claimed as new, is:—

The combination in a draft equalizer, of a draft pole, a forwardly slanting brace extending from one side of said pole, a second forwardly slanting brace extending from the same side of said pole and terminally bent to meet the first named brace, said braces being terminally equipped with spaced vertically alining eyes, two levers of unequal length having opposing ends pivotally mounted between said eyes, the longer lever extending outwardly from and the shorter lever extending inwardly toward said pole, a rearwardly slanting bracket extending from said pole upon the same side as said braces, a supporting plate extending outwardly from said pole to meet said bracket and being terminally secured thereto, said plate being provided with spaced apertures, a sheave rotatably mounted on said plate and adjustable within said apertures, rods pivoted to the medial points of said levers, a chain connecting the ends of said rods and trained over said sheave, a double tree connected to said short lever, a bar connected to said long lever, a swingle tree secured to the outer end of said bar, and a double tree secured to the inner end of said bar.

In testimony whereof, I affix my signature, in presence of two witnesses.

HERBERT B. WHITE.

Witnesses:
M. F. CONDON,
MARTIN KELSON.